United States Patent
Malone et al.

(10) Patent No.: US 6,598,629 B2
(45) Date of Patent: Jul. 29, 2003

(54) SANDING TRUCK SANDBAGGING APPARATUS

(76) Inventors: Morris J. Malone, 11122 Valley Ave. E., Puyallup, WA (US) 98372; Morris W. Malone, 11122 Valley Ave. E., Puyallup, WA (US) 98372; Viola C. Malone, 11122 Valley Ave. E., Puyallup, WA (US) 98372

( * ) Notice: Subject to any disclaimer, the term of this patent is extended or adjusted under 35 U.S.C. 154(b) by 0 days.

(21) Appl. No.: 09/858,288

(22) Filed: May 15, 2001

(65) Prior Publication Data

US 2001/0042763 A1 Nov. 22, 2001

Related U.S. Application Data

(60) Provisional application No. 60/204,501, filed on May 16, 2000.

(51) Int. Cl.[7] .............. B65B 1/04; B65B 3/04; B65B 37/00; B67C 3/00
(52) U.S. Cl. ............ 141/231; 141/313; 141/317; 141/351; 141/362; 222/415; 222/627; 414/518; 414/519
(58) Field of Search ............... 141/231, 313, 141/317, 351, 360–362, 10; 222/415, 626, 627; 414/507, 518, 519; 298/7

(56) References Cited

U.S. PATENT DOCUMENTS

| | | | |
|---|---|---|---|
| 2,586,557 A | 2/1952 | Newbold | 226/59 |
| 3,552,346 A | 1/1971 | Garden | 141/72 |
| 4,044,921 A | * 8/1977 | Caverly | 141/391 |
| 5,437,318 A | 8/1995 | Kanzler et al. | 141/313 |
| 5,740,950 A | 4/1998 | Kanzler et al. | 222/236 |
| 5,873,396 A | * 2/1999 | Biebrach et al. | 141/10 |
| 6,112,956 A | 9/2000 | Malone | 222/642 |

* cited by examiner

Primary Examiner—Timothy L. Maust
(74) Attorney, Agent, or Firm—Dean A. Craine

(57) ABSTRACT

A sandbagging manufacturing apparatus designed to be used with standard sanding trucks normally used with a broadcast spreader. The truck includes a large hopper with a hydraulically controlled conveyor belt located longitudinally inside the large hopper that delivers sand to a rear opening. Located below the rear opening is rigid framework used to hold the broadcast spreader. The apparatus includes a small hopper selectively attached to the framework below the hopper's rear opening. The small hopper is designed to slide into brackets formed on the framework so that the small hopper and broadcast spreader may be easily exchanged. A vertically aligned chute is attached to the small hopper through which sand falls to fill sandbags. The apparatus also includes a control box designed to control the operation of the conveyor belt. Located in the control box is an adjustable electric timer that controls the length of time the conveyor belt is activated which, in turn, controls the amount of sand delivered to the hopper's rear opening area. A main on-off switch is provided on the outside surface of the control box, which controls activation of the conveyor belt and the timer.

5 Claims, 3 Drawing Sheets

SANDING TRUCK SANDBAGGING APPARATUS

This is a utility patent application based on a provisional patent application (Ser. No. 60/204,501) filed on May 16, 2000.

BACKGROUND OF THE INVENTION

1. Field of the Invention

This invention pertains to sandbagging apparatus for making individual sandbags and more particularly, to sandbagging apparatus that attach to the back of a standard roadway sanding truck.

2. Description of the Related Art

Many municipalities use sanding trucks to spread sand on roadways during snowy or icy roadway conditions. Standard sanding trucks include a large hopper located on the bed of the truck with a selectively operated gate over the rear opening of the hopper and a hydraulic control conveyor belt located along the bottom of the hopper that delivers sand to the rear opening. Located behind and below the rear opening is a broadcast spreader that receives sand from the rear opening and evenly distributes it over the roadway immediately behind the truck.

The broadcast spreader is a relatively small structure that is manually lifted into a rigid frame located behind and below the rear opening. During use, the gate is manually opened and closed by the operator. The broadcast spreader and conveyor belt are connected to control switches connected to the truck's hydraulic system. The operation of the gate, conveyor belt, and broadcast spreader are coordinated so that sand is evenly dumped and spread over the roadway.

Large sandbagging apparatus, such as those shown in U.S. Pat. No. 6,112,956 which are designed to manufacture large quantities of sandbags, are too expensive for small municipalities to purchase. Fortunately, the many municipalities only need an apparatus to manufacture a small number of sandbags. A sandbagging apparatus that can be used with existing sanding trucks to manufacture small quantities of sandbags would be desirable.

SUMMARY OF THE INVENTION

It is an object of the present invention to provide a sandbagging apparatus for manually making individual sandbags.

It is another object of the invention to provide a sandbagging apparatus that may be temporarily attached to a standard sanding truck.

It is another object of the invention to provide such sandbagging apparatus that replaces a standard sanding truck's broadcast spreader.

These and other objects of the invention which will become apparent are met by a sandbagging apparatus that selectively attaches to a standard sanding truck that includes a large hopper with a hydraulically controlled conveyor belt aligned horizontal and inside the hopper that selectively delivers sand to the hopper's rear opening. The apparatus, which replaces the broadcast spreader located below the hopper's rear opening, includes a small hopper positioned behind and below the rear opening. The small hopper is designed to fit into the framework normally used to hold the broadcast spreader. When desired, the broadcast spreader is removed from the framework and replaced with the small hopper. The small hopper includes a vertically aligned chute which directs sand from the rear opening into sandbags positioned below the chute.

The apparatus also includes a control box connected between the truck's main hydraulic system and the conveyor belt's hydraulic system. Located inside the control box is a main on-off switch that controls activation of the conveyor belt and an adjustable timer that controls the length of time the conveyor belt is activated. During use, the timer is set to a desired setting so that when the main on-off switch is activated, the conveyor belt is opened a specific length of time to deliver a specific amount of sand to the sandbag. In the preferred embodiment, the timer is electrically connected to the truck's electrical circuit.

The apparatus also includes an optional, adjustable support table having two vertically aligned arms and a horizontal support member that selectively attaches the framework. When assembled, the support member is positioned below the chute and may be adjusted in height, rotated and folded upward and behind the small hopper for temporary compact storage.

DESCRIPTION OF THE PREFERRED EMBODIMENT(S)

Figure 1:
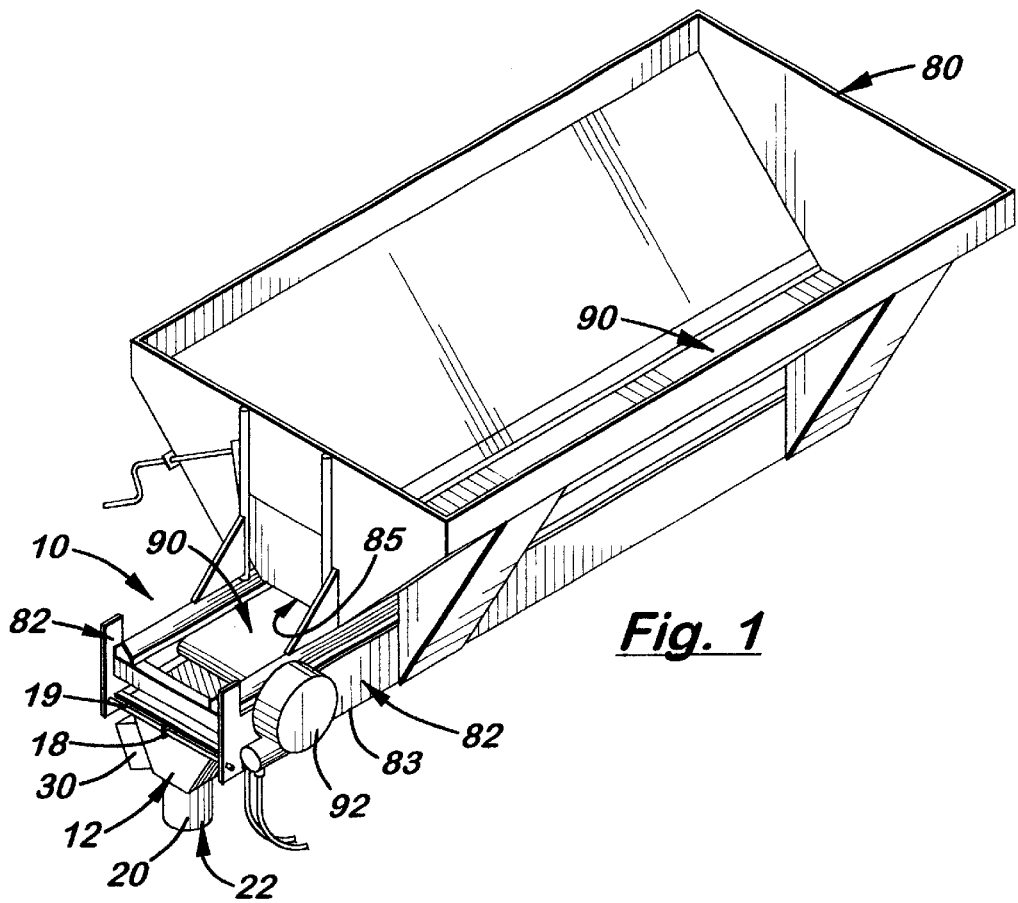
FIG. 1 is a perspective view of the sandbagging manufacturing apparatus attached to a large hopper.

Referring to the accompanying FIGS., there is shown and described a sandbagging manufacturing apparatus 10 designed to be used with a standard sanding truck 83 that transports a large hopper 80 with a hydraulically controlled conveyor belt 90 disposed longitudinally on the bottom of the hopper 80 that, during use, delivers sand 95 through the hopper's rear opening 85. The truck 83 also includes a rearward extending framework 82 normally used to hold a broadcast spreader (not shown) behind and below the rear opening 85.

Figure 2:
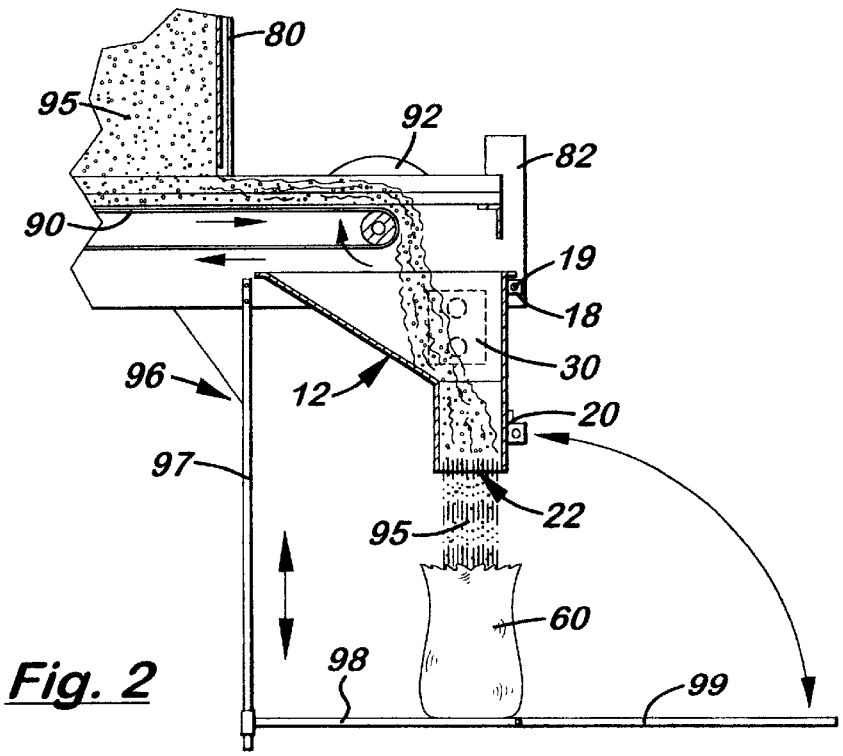
FIG. 2 is a sectional, side elevational view taken along line 2—2 in FIG. 3.
Figure 3:
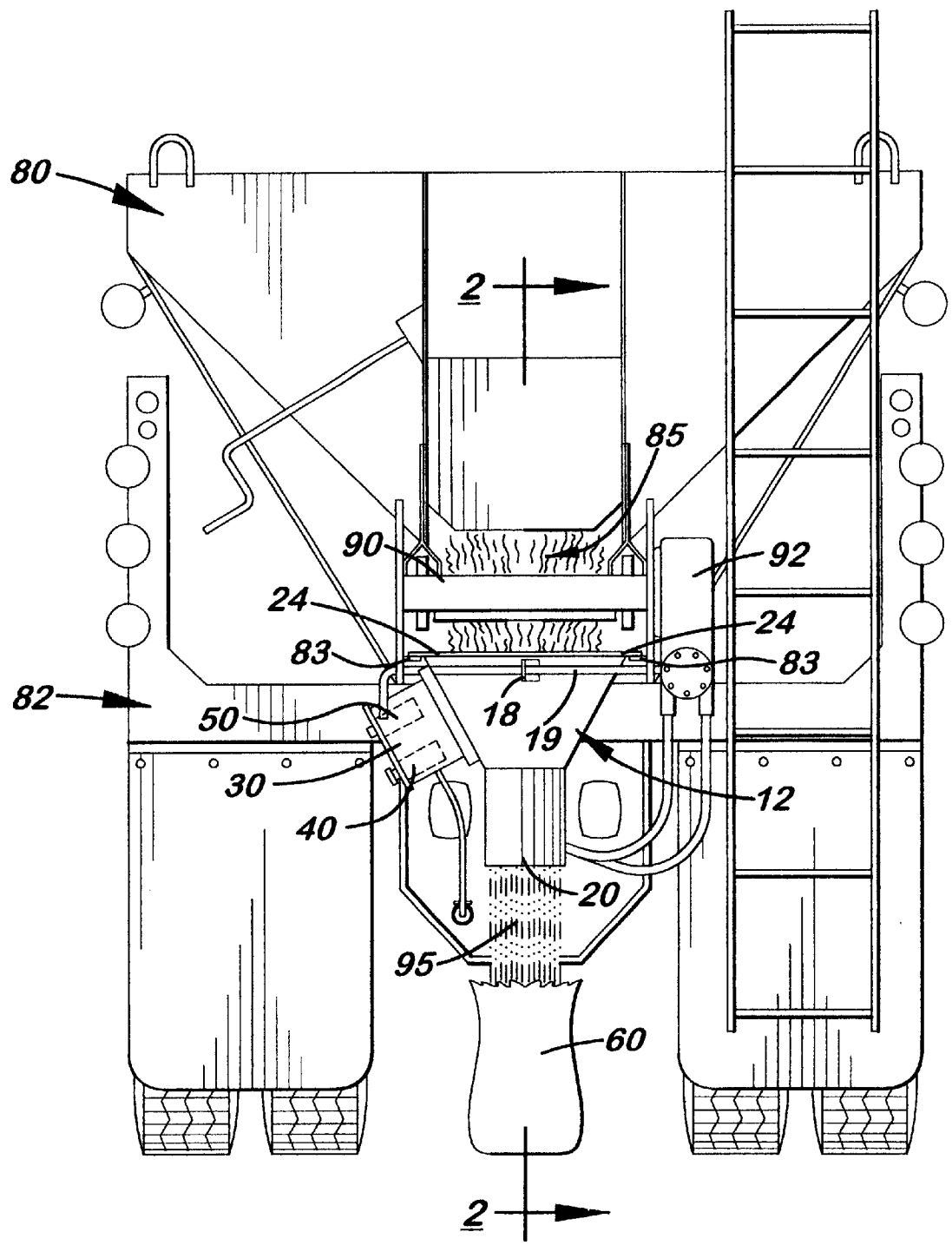
FIG. 3 is a rear elevational view of a standard sanding truck with the apparatus positioned below the rear opening of the large hopper.

As shown in FIGS. 2 and 3, the small hopper 12 includes two laterally extending plate members 24 designed to slide into two L-shaped brackets 84 located on the framework 82. Formed on the small hopper 12 is a vertically aligned chute 20 which directs discharged sand 95 from the rear opening 85 into sandbags 60 positioned below the lower opening 22 on the chute 20.

Figure 4:
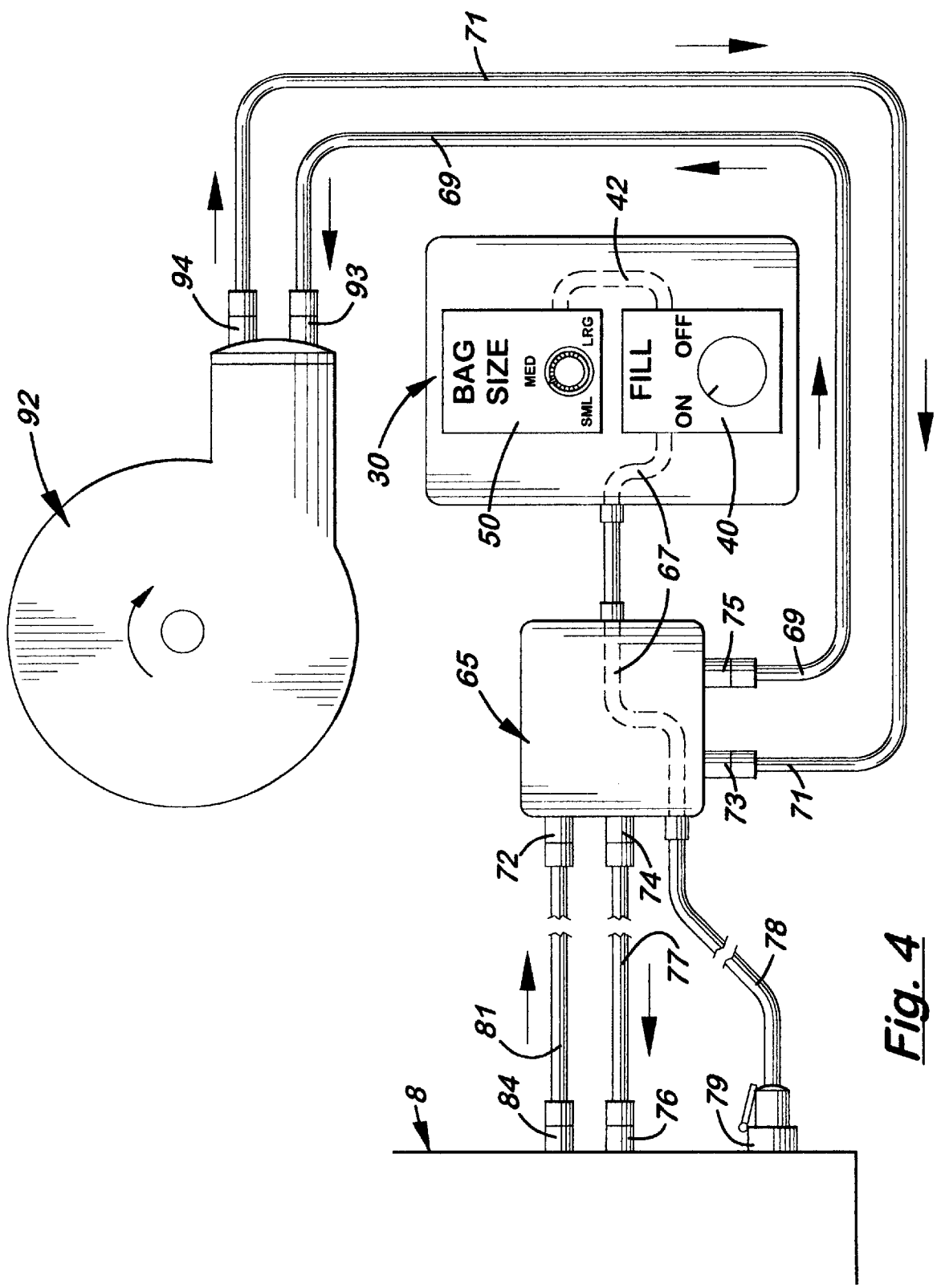
FIG. 4 is an illustration showing the control box and control valve system connected to the truck's hydraulic and electrical systems used to control the conveyor belt and the apparatus' timer.

As shown in FIGS. 3 and 4, the apparatus 10 also includes a rear mounted control box 30 mounted on the sides of the small hopper 12 and connected to the truck's hydraulic system to control the operation of the conveyor belt 90. Located inside the control box 30 is an adjustable timer 50 that controls the length of time the conveyor belt 90 is activated which, in turn, controls the amount of sand 95 delivered to the small hopper 12. A main on-off switch 40 is provided on the surface of the control box 30 that controls activation of the conveyor belt's motor 92. Disposed between the control box 30 and the conveyor belt's motor 92 is an electric control valve 65. Connected to the control valve 65 is a cable 78 that plugs into a standard 12 volt plug-in 79 on the truck 75. Wires 67 inside the control box

30 then deliver electricity from the control valve 65 to the on-off switch 40. A second set of wires 42 is used to deliver electricity from the on-off switch 40 to the timer 50.

The control valve 65 includes two hydraulic input ports 72, 73 and two hydraulic output ports 74, 75. The first input port 72 is connected to a first hydraulic line 82 connected at its opposite end to the first hydraulic output port 84 on the truck 83. The first output port 75 is connected to a second hydraulic line 69 connected at its opposite end to an input port 93 on the conveyor's hydraulic motor 92. The first output port 74 is connected via a third hydraulic line 85 connected to the input port 76 connected to the truck 83. The second input port 73 is connected via a fourth hydraulic line 71 connected to the output port 94 on the conveyor's hydraulic motor 92.

During assembly, a standard sanding truck 83 transporting a large hopper 80 with a longitudinally aligned conveyor belt 90, a framework 82 designed to hold a broadcast spreader is selected. The broadcast spreader is removed from the framework 82 and a small hopper 12 is then placed over the two brackets. A cross bar 19 is inserted through holes (not shown) formed in the framework 82 and a bracket 18 attached to the rear surface of the small hopper 12 to hold the small hopper 12 within the framework 82 while the truck 83 is driven. The control box 30 is then connected to the truck's electrical and hydraulic circuits as shown in FIG. 4.

During operation, sand is placed into the large hopper 80 and the truck 83 is driven to the desired location where a large quantity of sandbags 60 is needed. When the truck 75 arrives at the desired location, the rear opening 85 to the hopper 80 is manually opened. The timer 50 on the control box 30 is then set at a desired setting to deliver a desired amount of sand 95 to a sandbag 60 over a selected time period. An empty sandbag 60 is then selected and placed under the lower opening 22 on the chute 20. The on-off switch 40 on the control box 30 is then activated to activate the conveyor belt 90 and deliver sand 95 to the rear opening 85 and into the small hopper 12. Once filled, the sandbag 60 is then removed and a new empty sandbag 60 is selected and placed under the chute 20. The cycle of activating the on-off switch 40 and removing and placing sandbags 60 under the chute 20 is repeated until the desired number of sandbags 60 has been manufactured.

In the preferred embodiment, the small hopper measures approximately 25 inches in length, 24 inches in width, and 9 inches in depth. The diagonal sides measure approximately 18-½ inches in length and 10 inches in width. The chute 20 is cylindrical and approximately 6 inches in diameter.

As shown in FIG. 2, the apparatus 10 also includes an optional, adjustable table 96 that has two vertically aligned arms that attach at the upper ends to the framework 82 behind the brackets 84. The table 96 includes a fixed horizontal support member 98 and a pivoting horizontal support member 99. During use, the pivoting support member 99 folds rearward and extends under the chute 22 so that a sandbag is supported thereon while being filed. When support for the sandbags is no longer needed, the pivoting support member 99 may be folded forward over the fixed horizontal support member 98.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A sandbagging apparatus for a sanding truck including a large electric hopper, with a rear opening, and a conveyor belt located therein, said truck also including a hydraulic system connected to said conveyor belt and used to deliver sand to a discharge area located behind said conveyor belt, said apparatus comprising:

a. hopper adapted to be mounted behind and below said discharge area of said conveyor belt to receive sand discharged therefrom, said hopper having a chute with a lower opening formed therein;

b. a hydraulic control valve adapted to be connected between said hydraulic system on a sanding truck and said conveyor belt;

c. a timer connected to said hydraulic control valve to control the length of time said conveyor belt is activated; and, d. a main on-off switch connected to said hydraulic valve and said timer.

2. The sandbagging manufacturing apparatus, as recited in claim 1, wherein said timer switch is electrically connected to said truck's electrical system.

3. The sandbagging apparatus, as recited in claim 1, wherein said hopper includes means for slidingly connecting said hopper to a sanding truck.

4. The sandbagging manufacturing apparatus, as recited in claim 3, wherein said sliding means is a pair of laterally extending brackets attached to said hopper and a pair of complementary-shaped brackets formed on the framework attached to the truck.

5. The sandbagging apparatus, as recited in claim 1, further including a means for locking said hopper on a sanding truck.

\* \* \* \* \*